(12) United States Patent
Rollfink et al.

(10) Patent No.: US 9,688,420 B2
(45) Date of Patent: Jun. 27, 2017

(54) METHOD AND DEVICE FOR ASSEMBLING AT LEAST ONE SEAT INTO AN AIRPLANE

(75) Inventors: Patrick Rollfink, Hamburg (DE);
Daniel Meister, Munich (DE)

(73) Assignee: EADS DEUTSCHLAND GMBH, Ottobrunn (DE)

( * ) Notice: Subject to any disclaimer, the term of this patent is extended or adjusted under 35 U.S.C. 154(b) by 567 days.

(21) Appl. No.: 14/006,613

(22) PCT Filed: Mar. 7, 2012

(86) PCT No.: PCT/EP2012/053885
§ 371 (c)(1),
(2), (4) Date: Jan. 8, 2014

(87) PCT Pub. No.: WO2012/126731
PCT Pub. Date: Sep. 27, 2012

(65) Prior Publication Data
US 2014/0123462 A1    May 8, 2014

(30) Foreign Application Priority Data
Mar. 22, 2011 (DE) .................. 10 2011 014 695

(51) Int. Cl.
*B64F 5/00* (2017.01)
*B64F 5/10* (2017.01)
(Continued)

(52) U.S. Cl.
CPC ............ *B64F 5/0009* (2013.01); *B64D 11/06* (2013.01); *B64F 5/10* (2017.01); *B64F 5/50* (2017.01);
(Continued)

(58) Field of Classification Search
CPC ........ B64F 5/0009; B64F 5/0036; B64F 5/00; B64D 11/06; B64D 11/0602; B64D 11/0696
See application file for complete search history.

(56) References Cited

U.S. PATENT DOCUMENTS 5,205,571 A    4/1993 Geier et al.
5,497,708 A    3/1996 Jeruzal
(Continued)

FOREIGN PATENT DOCUMENTS

DE    19929739 A1    1/2000
DE    10358678 A1    7/2005
(Continued)

OTHER PUBLICATIONS

Corresponding International Application No. PCT/EP2012/053885 Search Report dated Aug. 29, 2012.
(Continued)

*Primary Examiner* — Christopher Besler
(74) *Attorney, Agent, or Firm* — Hauptman Ham, LLP

(57) ABSTRACT

A seat assembling method for assembling at least one seat into an airplane, the method having the steps of position a seat installing device at a predetermined assembly position in the airplane, convey the at least one seat into the interior of the airplane to the seat installing device by means of a seat conveying device, transfer the seat from the seat conveying device to the seat installing device, and install the seat by means of the seat installing device which is positioned at the assembly position.

16 Claims, 12 Drawing Sheets

(51) Int. Cl.
*B64F 5/50* (2017.01)
*B64D 11/06* (2006.01)
(52) U.S. Cl.
CPC ..... *B64D 11/0696* (2013.01); *Y10T 29/49826* (2015.01); *Y10T 29/53091* (2015.01); *Y10T 29/53539* (2015.01)

(56) References Cited

U.S. PATENT DOCUMENTS

| | | | | |
|---|---|---|---|---|
| 5,975,822 | A | * 11/1999 | Ruff | B64D 11/0696 292/218 |
| 6,089,665 | A | 7/2000 | Andrigo | |
| 2002/0109390 | A1 | 8/2002 | Hagiike | |
| 2005/0047901 | A1 | 3/2005 | Eggleston et al. | |
| 2007/0193904 | A1* | 8/2007 | Cromie | B62B 3/10 206/386 |
| 2008/0309128 | A1* | 12/2008 | Schneider | B60N 2/5621 297/180.1 |
| 2010/0001546 | A1* | 1/2010 | Christensen | B64D 11/0696 296/65.13 |

FOREIGN PATENT DOCUMENTS

| | | | |
|---|---|---|---|
| EP | 2045118 | A2 | 4/2009 |
| GB | 2426549 | A | 11/2006 |

OTHER PUBLICATIONS

Corresponding German Application No. 102011014695.4 Foreign Action dated Feb. 17, 2012.
Office Action in DE Application No. 10 2011 014 695.4, dated Jan. 31, 2017, (5 pages).

\* cited by examiner

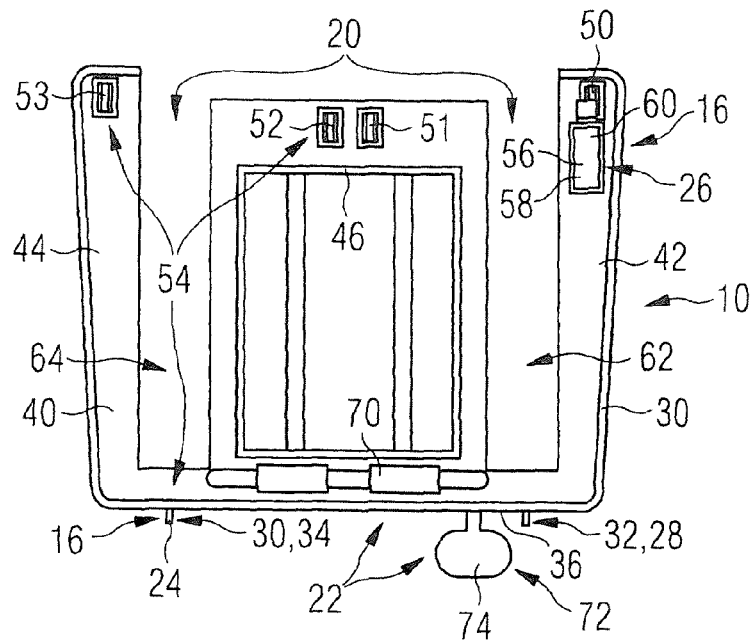
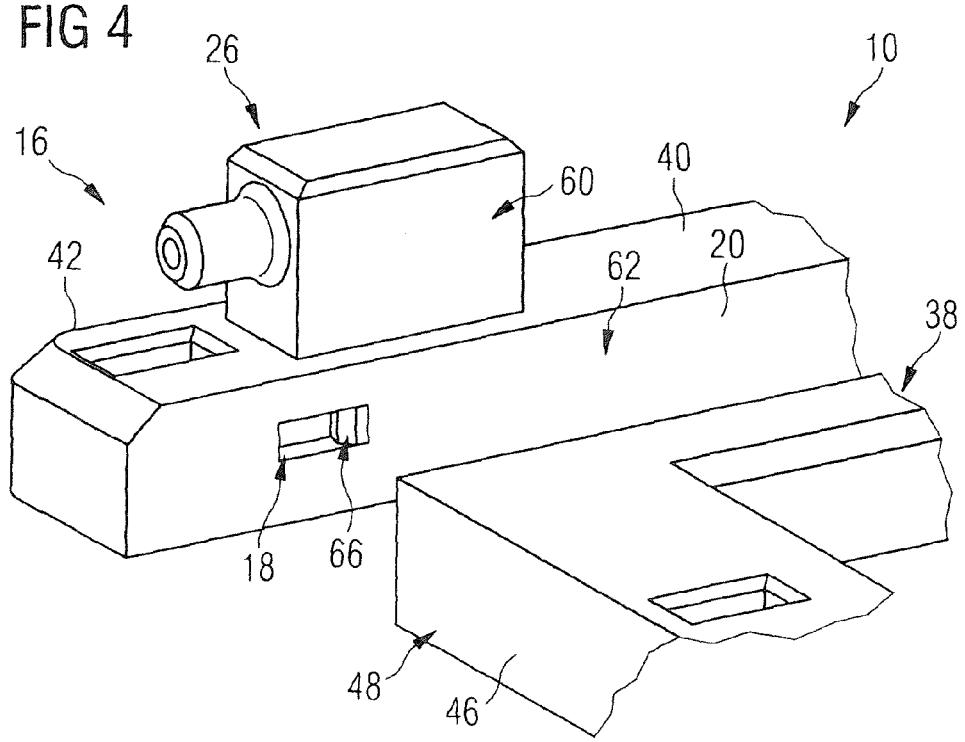

METHOD AND DEVICE FOR ASSEMBLING AT LEAST ONE SEAT INTO AN AIRPLANE

The invention relates to a seat assembling method for assembling at least one seat into an airplane and to a seat assembling device for assembling at least one seat into an airplane. In addition, the invention relates to devices for use in such a seat assembling device and in such a seat assembling method.

Airplanes, which serve for transporting passengers, have a plurality of seats for the passengers and said seats have to be fixedly anchored to the airplane inside a passenger cabin. In order to utilize the passenger compartment in an optimum manner, it is desirable to position the seats in a precise manner so that, on the one hand, the passengers have uniform, adequate space but, on the other hand, no space is wasted either.

The anchoring of the seats is effected in the majority of cases in seat rails which are installed in the longitudinal direction of the airplane in a floor of the passenger cabin.

In the case of a seat assembling method for installing the seats in airplanes which is carried out currently by Airbus Deutschland GmbH, first of all the positions at which the seats are to be installed are marked along the seat rail from front to back by means of a gauge. In this case, measuring errors can occur which accumulate at the end. In addition, depending on the size of the airplane, at least 48 seats are installed such that said method step also takes up a good deal of time.

The seats are supplied from the seat manufacturer to the warehouse or onto the airplane and are manually lifted onto simple trucks. Using said trucks, the seats are conveyed to in front of the airplane door in order then to be carried manually into the airplane cabin to the marked position. This includes heavy physical work, especially as at least 48 seats are installed in the airplane. Whilst the seats are being conveyed, it is possible for the seat to knock against components that have already been installed in the airplane and possibly damage them. Carrying the seats also involves an increased risk of injury. The seats are then lifted into the seat rail, it being possible for the seat feet to become skewed in the seat rail. The seat is then moved by half an inch (approximately 13 mm) in the longitudinal direction of the seat rail (in the x direction). A large amount of heavy physical work is also included in these operating steps.

Consequently, the current seat installing process for civil airplanes is characterized by increased set-up time, increased expenditure of labor and time, increased variability in the process, increased proportion of heavy physical work and increased risk of injury and damage.

Consequently, it is the object of the invention to create an improved method and an improved device for assembling seats into airplanes.

Said object is achieved by a seat assembling method as claimed in claim 1 and a seat assembling device as claimed in the secondary claim. A seat installing device and a seat conveying device for use in the seat assembling method as claimed in the invention and in the seat assembling device as claimed in the invention are the object of the further secondary claims.

Advantageous developments of the invention are the object of the sub-claims.

The invention proposes a seat installing process with the help of coupled seat conveying and seat installing devices.

In a preferred manner, a seat conveying device for conveying the seats from the manufacturer into the airplane, the seat seamlessly transferred from the seat conveying device into a seat installing device, which has been positioned beforehand by means of a calibration system, and the seat lowered into a seat rail and displaced to the certified position by means of the seat installing device is provided.

By using coupled conveying and installing devices in the seat installing process, the installing of the seat can be simplified, accelerated and qualitatively improved.

The invention creates, in particular, a seat assembling method for assembling at least one seat into an airplane, said method having the following steps:
a) position a seat installing device at a predetermined assembly position in the airplane,
b) convey the at least one seat into the interior of the airplane to the seat installing device by means of a seat conveying device,
c) transfer the seat from the seat conveying device to the seat installing device,
d) install the seat by means of the seat installing device which is positioned at the assembly position.

The identification of the steps by way of a), b), . . . purely serves to refer more simply to the steps and is not to signify any restriction whatsoever to any sequence of the steps. The steps can be carried out in any logically conceivable sequence. In particular, the sequence of the steps a) and b) is arbitrary; the step c) is preferably carried out once both steps a) and b) have been carried out. It is additionally preferable for the step d) to be carried out after the step c).

In a preferred development of the seat assembling method, d) includes the following steps:
d1) lower the seat into a seat rail which is arranged on the airplane and
d2) displace the seat to the desired seat position.

It is additionally preferable for both steps d1) and d2) to be carried out by means of the seat installing device.

In a further preferred development of the seat assembling method, step b) includes the step:
b1) convey the at least one seat from a seat manufacturer or seat supplier to the seat installing device which is positioned in the airplane.

The seat installing device preferably serves, on the one hand, for positioning the seats in a precise manner and, on the other hand, for assembling the seats. The seat conveying device can be coupled with the seat installing device in order to transfer the seats conveyed into the airplane for the purposes of assembly. In a particularly preferred development of the invention, one seat conveying device is provided per seat or seat combination. It is possible to provide the seats with the seat conveying device directly at the seat manufacturer. Each seat can be conveyed in this way over the entire conveying path by way of the seat conveying device, it also being possible for the seats to be handled by way of the conveying device when being transferred into transporting units such as containers, trucks and pallets etc. This simplifies the conveying of the seats in a considerable manner. For positioning the seat installing device, step a) preferably includes:
a1) position the seat installing device by way of the seat rail in a direction extending transversely with respect to the seat rail and
a2) position the seat installing device in the longitudinal direction of the seat rail by means of an optical distance measuring instrument.

In a preferred development, the seat installing device is provided for this purpose with a first positioning device which grips the seat rail and with a second positioning device which includes the optical measuring instrument.

The first positioning device can include, for example, two or more suitable engagement elements for engagement in two parallel seat rails. Said engagement elements can be inserted into the seat rail in a positive locking manner such that the seat installing device is fixed to the seal rail in a suitable manner so as to be still displaceable only in the longitudinal direction of the seat rail. The positioning along the seat rail is then preferably effected by way of the second positioning device. To this end, it is possible to provide on the seat installing device a laser distance measuring means or the like which measures out the distance between the seat installing device in the longitudinal direction of the seat rail and a reference point inside the airplane.

The seat conveying device and the seat installing device are realized for reciprocal coupling for the purposes of positioning and transferring the seats in a suitable manner.

In a preferred development, one of the two devices has a positioning receiving means in which a positioning projection of the other device engages. The corresponding receiving means and the projection can themselves be realized in an aligning manner, e.g. the projection can have a tapering tip and the receiving means can have a conical narrowing.

An advantageous embodiment of the seat assembling method is characterized in that step c) includes:
c1) move the seat conveying device into positive locking with the positioned seat installing device;
c2) grip and hold the seat by means of a seat gripping and holding device which is mounted on the seat installing device; and
c3) remove the seat conveying device.

A further advantageous development of the seat assembling method has the step which is effected after step d):
e) release the seat gripping and holding device and remove the seat installing device.

As claimed in a further aspect, the invention creates a seat assembling device for assembling at least one seat in an airplane, said seat assembling device having:
a seat installing device for positioning and installing the seat at the desired assembly position and
a seat conveying device for conveying the seat from a seat supplier to the desired assembly position,
wherein the seat installing device and the seat conveying device have coupling devices which are complementary to one another, by means of which the two devices are able to interlock in a gripping positive locking manner in order to transfer the seat from the seat conveying device to the seat installing device which is aligned at the assembly position.

It is provided in an advantageous manner that the seat installing device has a first positioning device for positioning the seat installing device in a direction transversely with respect to a seat rail of the airplane and a second positioning device for positioning the seat installing device in a longitudinal direction of the seat rail.

The first positioning device preferably has an engagement projection for engaging in the seat rail in a positioning manner.

In an advantageous manner, the second positioning device has an optical measuring device for measuring a distance along the seat rail.

For receiving and for assembling the seat, it is further provided in an advantageous manner that the seat installing device has a seat gripping and holding device for gripping the seat which is conveyed to the assembly position by means of the seat conveying device.

It is provided in a preferred manner that the seat gripping and holding device includes several pairs of clamping jaws which, when actuated by an operator, are able to grasp and hold on to one seat foot of the seat each.

In a further preferred development of the seat assembling device, it is provided that the seat installing device is realized for lowering the seat until engagement in a seat rail of the airplane and for displacing the seat inside the seat rail.

Further aspects of the invention relate to the seat installing device and the seat conveying device in each case individually.

Accordingly, corresponding to a further aspect of the invention, a seat installing device is provided for installing a seat into an airplane, said seat installing device being realized in an advantageous manner for positioning the seat and for installing it.

As claimed in a further aspect of the invention, a seat conveying device is provided for conveying at least one seat for an airplane from a seat manufacturer right into the airplane.

The seat installing device is realized for coupling with the seat conveying device. The seat conveying device is realized for coupling with the seat installing device.

In a preferred development, the seat installing device has a first positioning device for positioning the seat installing device by way of the seat rail in a direction extending transversely with respect to the seat rail.

In a further advantageous development, the seat installing device has a second positioning device for positioning the seat installing device in the longitudinal direction of the seat rail. In an advantageous manner, the second positioning device has an optical distance measuring instrument.

In an advantageous manner, the seat installing device has a coupling device by means of which it is couplable with positive locking with the seat conveying device in order to take the seat over from the seat conveying device.

In an advantageous manner, the seat conveying device has a second coupling device for coupling to the seat installing device for transferring the seat.

In an advantageous manner, the seat installing device has a seat gripping and holding device for gripping and holding the seat when the seat is being transferred and assembled.

The seat gripping and holding device preferably has several pairs of clamping jaws.

In a preferred development, four pairs of clamping jaws are provided for simultaneously gripping four feet of the seat to be assembled.

The seat installing device is preferably realized in such a manner that all the anchoring points of the seat, for example three, four or more feet of the seat, are able to be inserted simultaneously into corresponding seat rails and moved simultaneously into assembly positions.

In a preferred development of the invention, the seat installing device is moved by means of a positioning system to the position at which the seat is to be installed. This means that the time-consuming marking of the seat rail becomes obsolete. Consequently, many sources are eliminated and the process step of positioning the seat is accelerated.

The seat is preferably moved from the manufacturer into the airplane, for example right into the aircraft cabin, and connected to the seat installing device by means of the seat conveying device. In this case, no more heavy physical work is necessary and the risk of injury and damage is reduced.

The seat is then preferably conveyed from the conveying device into the installing device, and the conveying device can be removed. The installing device preferably lowers the seat down into the seat rail, all four seat feet preferably being fixed in order to prevent the seat feet becoming skewed in the seat rail. The seat is then preferably moved by half an inch in the x-direction by means of the installing device. Here too, no more heavy physical work is necessary.

Advantageous developments are the object of the subclaims.

The invention is explained in more detail below by way of the accompanying drawings, in which:

FIG. 3 shows a top view onto the seat installing device;

FIG. 4 shows a view of a detail of the seat installing device with a positioning device and a seat gripping and holding device;

Figure 1:
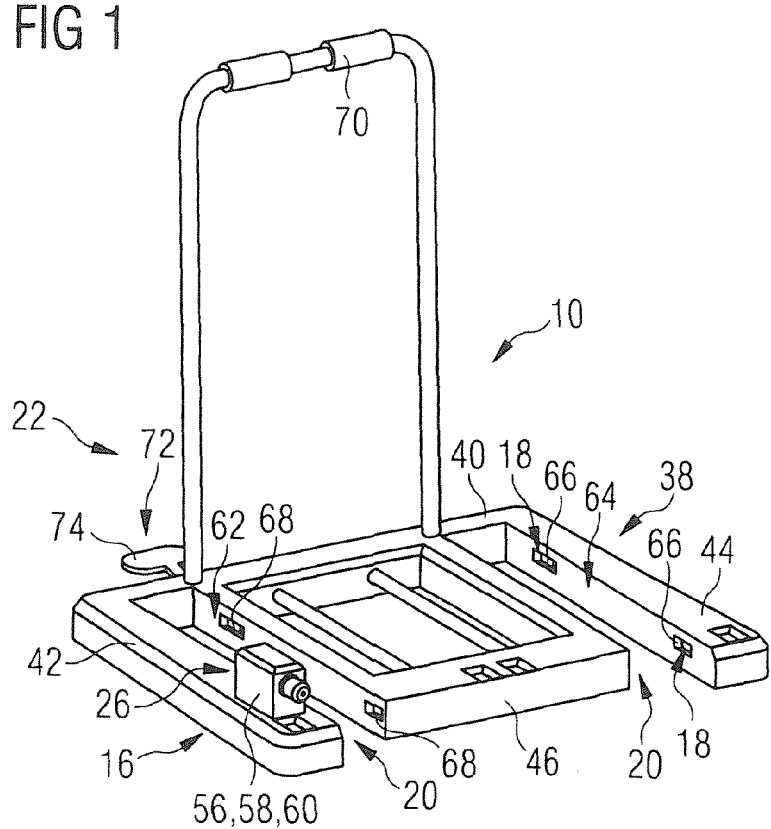
FIG. 1 shows a first perspective view of a seat installing device.
Figure 2:
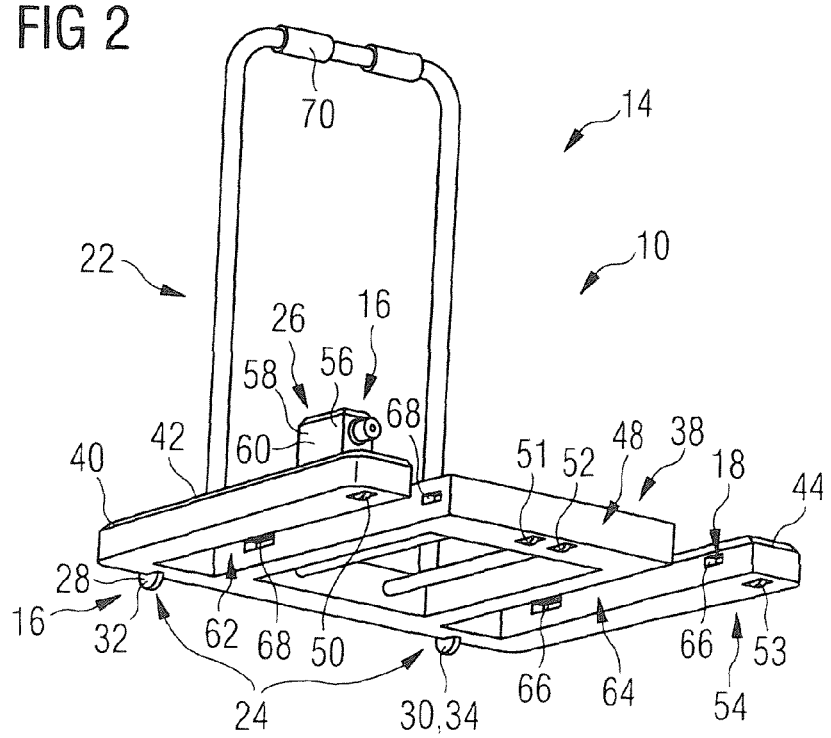
FIG. 2 shows a second perspective view of a seat installing device.
Figure 5:
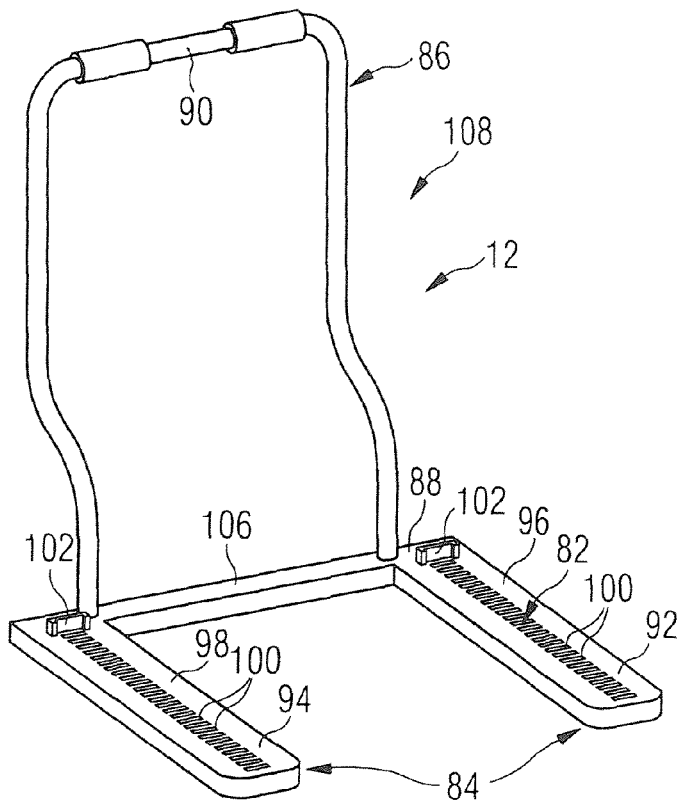
FIG. 5 shows a first perspective view of a seat conveying device.
Figure 6:
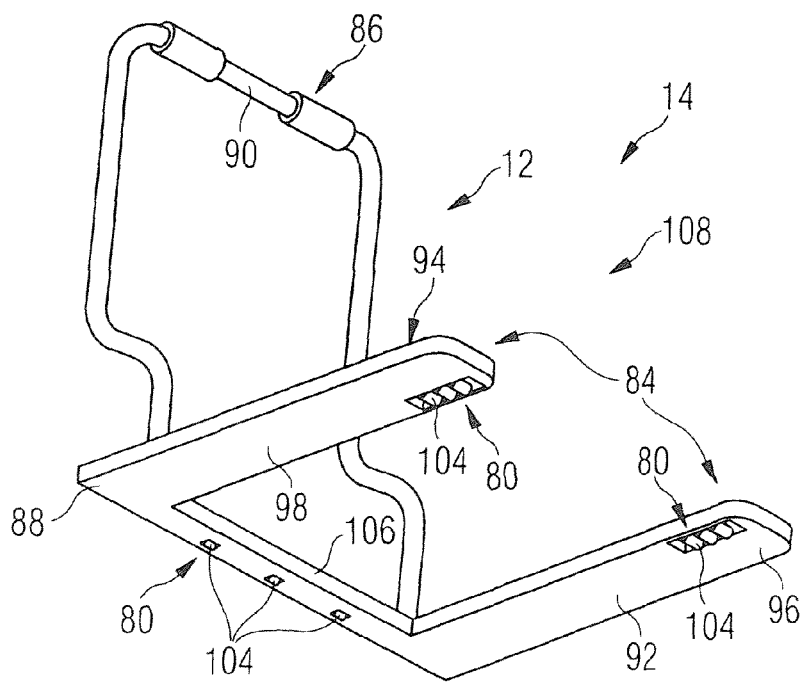
FIG. 6 shows a second perspective view of a seat conveying device.
Figure 7:
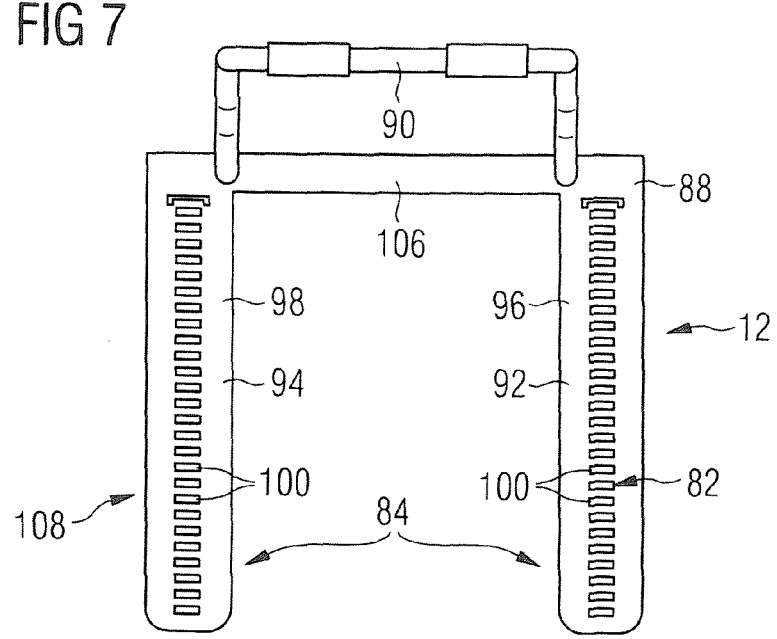
FIG. 7 shows a top view of the seat conveying device.

An embodiment of a seat installing device 10 is shown in FIGS. 1 to 4, whilst an embodiment of a seat conveying device 12 is shown in FIGS. 5 to 7. A seat assembling device 14 for assembling at least one seat into an airplane is formed as a result of the combination of the seat installing device 10 and the seat conveying device 12.

First of all, the seat installing device 10 will be explained in more detail below by way of the representation in FIGS. 1 to 4.

The seat installing device 10 has a positioning system 16 for positioning the seat installing device 10 at the desired assembly point, a seat gripping and holding device 18 for gripping the seat and for holding the seat for the purposes of assembling it, a first coupling device 20 for coupling with the seat conveying device 12 for transferring the seat and a first handling device 22 for the handling and/or operating of the seat conveying device 12 by means of an operator.

The positioning system 16 has a first positioning device 24 for positioning the seat installing device 10 transversely with respect to the direction of extension of a seat rail and a second positioning device 26 for positioning the seat installing device along the longitudinal direction of the seat rail.

The first positioning device 24 has a first engagement projection 28 for engagement in a first seat rail and a second engagement projection 30 for engagement in a second seat rail.

The two engagement projections 28, 30 have in each case at least one rotatingly mounted roller 32, 34 on a rear edge region 36 of a base part 38 of the seat installing device 10.

The base part 38 has a U-shaped basic frame 40 with two lateral legs 42, 44 and one inner stabilizing frame 46.

Further rollers 50, 51, 52 and 53, which, together with the first roller 32 and the second roller 34, form a displacing device 54 for displacing the seat installing device 10 over the ground, are provided on a front region 48 of the base part 38.

The second positioning device 26 has an optical measuring device 56 with a measuring instrument 58 for detecting a distance to a reference point. The measuring device 56 with the optical measuring instrument 58 is shown in more detail in FIG. 4. As can be seen from FIG. 4, a laser 60 is provided on at least one of the two legs 42, 44 for distance measuring.

The first coupling device 20 has a first receiving means 62 between a first leg 42 and the stabilizing frame 46 and a second receiving means 64 between the second leg 44 and the basic frame 40. The two receiving means 62, 64 serve for receiving in a positive locking manner two complementarily realized positioning projections of the seat conveying device 12 which will be described in more detail hereafter.

The seat gripping and holding device 18 has several pairs of clamping jaws 66, 68 for gripping the seat feet. The clamping jaws 66, 68 are accommodated in each case at opposite points inside the receiving means 62, 64 in the legs 42, 44 and the stabilizing frame 46.

The first handling device 22 has a handle 70 for gripping, holding and moving the seat installing device 10 and an actuating device 72 for actuating the seat gripping and holding device 18. The actuating device 72 has, for example, a foot pedal 74 for moving the clamping jaws 66, 68, for example, in a hydraulic or pneumatic manner. The clamping jaws 66, 68 can be moved toward one another, actuated in particular in a hydraulic or pneumatic manner, by means of the foot pedal 74 in order to clamp the seat feet between them. By means of a pressure relief device (not shown in detail), the pressure on the clamping jaws 66, 68, for example hydraulic pressure or pneumatic pressure, can be removed again such that the clamping jaws 66, 68, which are pretensioned in their pulled-back position which is shown in FIGS. 1 to 4, move back again. As a result the seat feet can be released again.

The seat conveying device 12 is explained in more detail below by way of the representation in FIGS. 5 to 7.

The seat conveying device 12 has a displacing device 80 for displacing the seat conveying device 12 over the ground; a seat supporting device 82 for supporting and holding the seats; a second coupling device 84 for coupling the seat conveying device 12 with the seat installing device 10 and a second handling device 86 for the handling of the seat conveying device 12 by means of an operator.

In the embodiment shown, the seat conveying device 12 has a U-shaped frame part 88 and a handle 90 which forms the second handling device 86.

The second coupling device 84 is realized in a complementary manner to the first coupling device 20 in order to position the seat installing device 10 and the seat conveying device 12 in a positive locking manner with respect to one another for transferring the seats.

For example, the second coupling device 84 has two positioning projections 92, 94 which are realized for engagement in a suitable, positive locking manner in the two receiving means 62, 64 of the seat installing device 10. The positioning projections 92, 94 are formed by two legs 96, 98 of the U-shaped frame part 88.

The seat supporting device 82 has a grid of elongated receiving indentations 100, which extend transversely with respect to the set-up of the legs 96, 98, or of receiving ribs and stops 102 on the top surface of the legs 96, 98. The receiving indentations 100 serve for receiving the foot points of the seat frames of differently realized seats. The spacing between the grids of the two legs 96, 98 from one another corresponds substantially to a spacing between a pair of seat rails in a passenger cabin of the airplane, for example an aircraft cabin.

The displacing device 80 has several rollers 104 on the bottom surface of the legs 96, 98 and on the bottom surface of a connecting web 106 of the frame part 88.

The seat conveying device 12 is consequently formed by a type of trolley 108, by way of which the seat is able to be provided. The trolley 108 has the basic functions of receiving the seat, conveying the seat and producing a connection to the seat installing device 10.

In a preferred development, the trolley 108 additionally also has the following functions with reference to receiving the seat:
  fixing the seat on the trolley
  fixing the trolley in the transporting container, e.g. in the truck—e.g. by means of a parking brake or by means of fixing points
  protecting the seat during transport—e.g. by means of protruding legs 96, 98, the handle 90 and/or a protective wrapping (not shown).

The trolley preferably also has the following functions for conveying the seat:
  displacing the trolley—by means of the displacing device 80
  steering the trolley—for example by means of steerable rollers 104
  braking the trolley—for example by means of braking devices/parking brakes (not shown in detail)
  indicating the status, e.g. braked/not braked.

With reference to the production of the connection to the seat installing device 10, in a preferred development the trolley 108 has the following functions:
  introducing the trolley into the seat installing device 10
  fixing the trolley in the seat installing device 10
  transferring the seat to the seat installing device 10.

The seat installing device 10 serves for positioning the seat and for supporting the seat assembling.

The following can be named as part steps for positioning the seat installing device 10:
  installing lasers
  receiving data
  determining the position of the seat installing device 10.

The step of installing the laser 60 includes, in particular, the fixing of the laser 60 on the seat installing device 10 and the producing of a data connection between the laser and a control device of the seat assembling device 14 (not shown in any detail).

The step of receiving data includes, in particular, the loading of a predetermined cabin layout and the choosing of the seat row in the cabin layout where the current seat is to be installed.

The step of determining the position of the seat installing device 10 includes, in particular, the measuring of the position of the seat installing device 10 by means of the laser 60 and the signaling of the currently measured actual position.

Accordingly, the seat installing device 10 has a data connection (not shown in detail) to the control device.

The supporting of the seat assembling by means of the seat installing device 10 includes, in particular, the steps:
  taking up the position
  producing the connection to the seat conveying device 12
  positioning the seat.

The step "taking up the position" preferably includes the following sub-steps:
  positioning by means of the first positioning device 24 in the direction transversely with respect to the longitudinal rails
  displacing the seat installing device 10 in the x-direction lengthways of the rail
  reflecting the laser 60 for determining the x-position
  fixing the seat installing device 10, for example by means of clamping or gripping devices (not shown in detail) which fix the seat installing device in relation to the seat rail.

The step "producing the connection to the trolley" includes, in particular, the following sub-steps:
  receiving the trolley 108
  fixing the trolley inside the seat installing device 10
  taking over the seat.

The step "positioning the seat" includes, in particular, the following sub-steps:
  lowering the seat
  displacing the seat (for example by half an inch)
  indicating the status (for example by means of the data interface).

An exemplary embodiment of a method for seat assembling is explained in more detail below by way of the representations in FIGS. 8 to 17.

Figure 8:
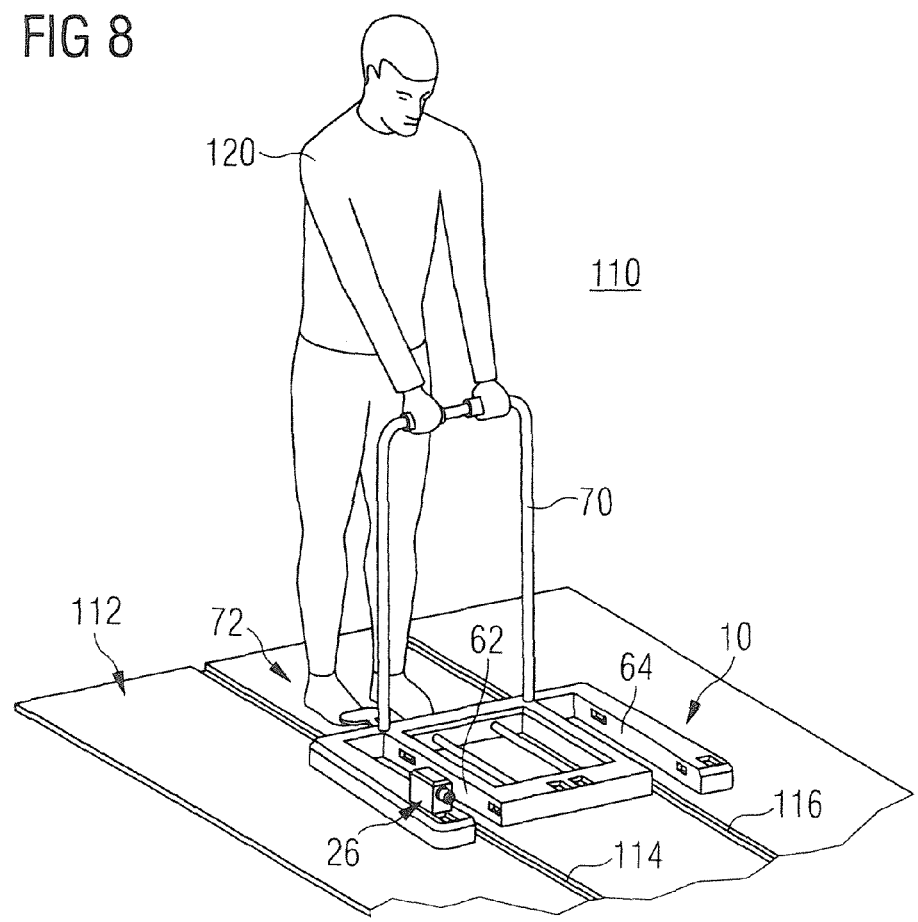
FIG. 8 shows a schematic representation of a first method step for seat assembling.

FIG. 8, in this case, shows a first step of a positioning of the seat installing device 10 inside an airplane, for example inside an aircraft cabin 110.

The aircraft cabin 110 has a floor 112 with a pair of seat rails 114, 116. The seat rails 114, 116 extend parallel to one another. The receiving means 62, 64 and the first roller 32 and the second roller 34 are realized corresponding to the spacing between the seat rails 114, 116 such that, when the first roller 32 is inserted into the first seat rail 114 and when the second roller 34 is inserted into the second seat rail 116, the seat rails 114, 116 are aligned centrally and parallel to the receiving means 62, 64. As a result of the engagement of the rollers 32, 34 in the seat rails 114, 116, the seat installing device 10 can only be moved parallel to the seat rails 114, 116 in the case of said alignment. To this end, the rollers 32, 34 have a relatively large diameter and a thickness such that they are received inside grooves in the seat rails 114, 116 with a small amount of play such that it is only possible to insert them in the seat rails 114, 116 in the appropriate alignment with respect to the said seat rails.

A first operator 120 positions the seat installing device 10 at the desired position with the help of the optical measuring instrument 58. As a result of the engagement of the rollers 32, 34 in the seat rails 114, 116, in this case, the rear edge region 36 rests on the floor 112 such that the seat installing device can be fixed in a corresponding manner by pressure downward onto the handle 70.

Figure 9:
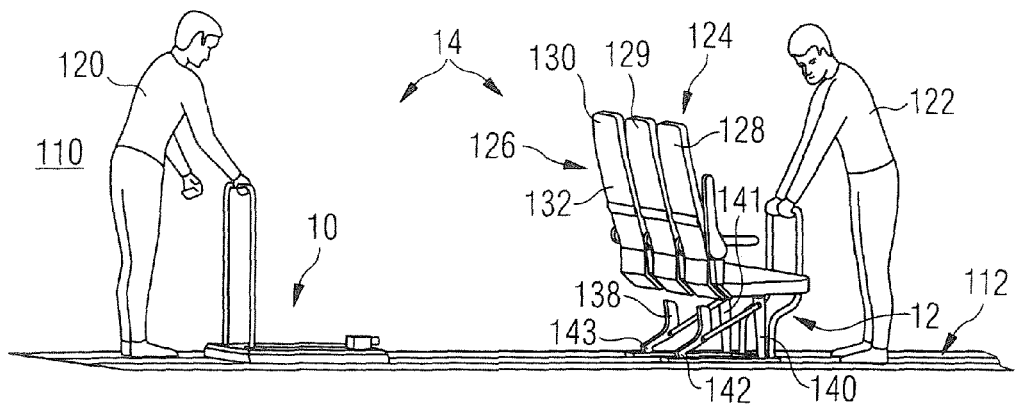
FIG. 9 shows a first perspective schematic representation of a second method step for seat assembling.
Figure 10:
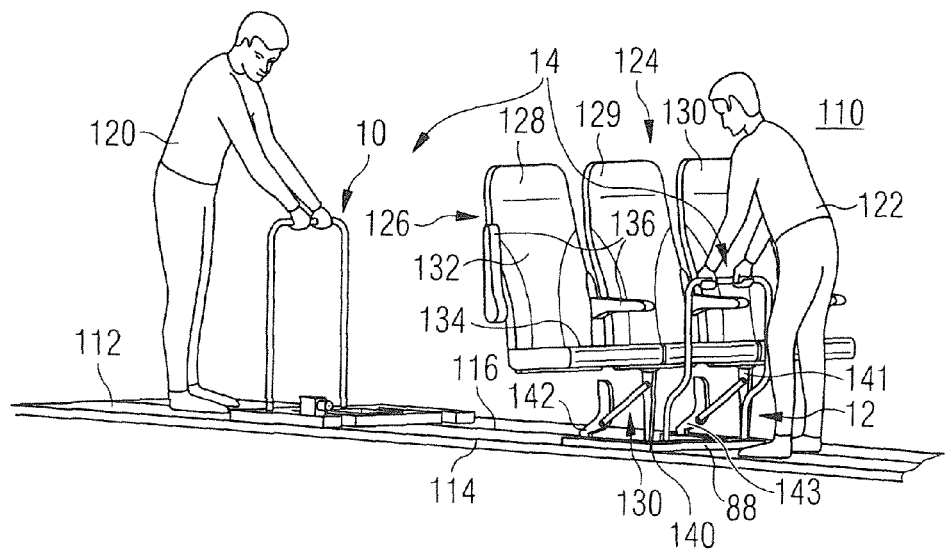
FIG. 10 shows a second perspective representation of the second method step.

FIGS. 9 and 10 show a second method step for the seat assembling, a second operator 122 moving a seat 124 into the aircraft cabin 110 by means of the seat conveying device 12 and displacing it toward the positioned seat installing device 10. The seat 124 is realized as a row of seats 126 with several individual seats 128, 129, 130 which each have a backrest 132, a sitting surface 134 and arm rests 136. The seat 124 has a seat frame 138. The seat frame 138 has, for example, four seat feet 140, 141, 142, 143, two front seat feet 140, 141 being positioned on the support device 82 in abutment against the stops 102 and two rear seat feet 142, 143 engaging in suitable receiving indentations 100.

Figure 11:
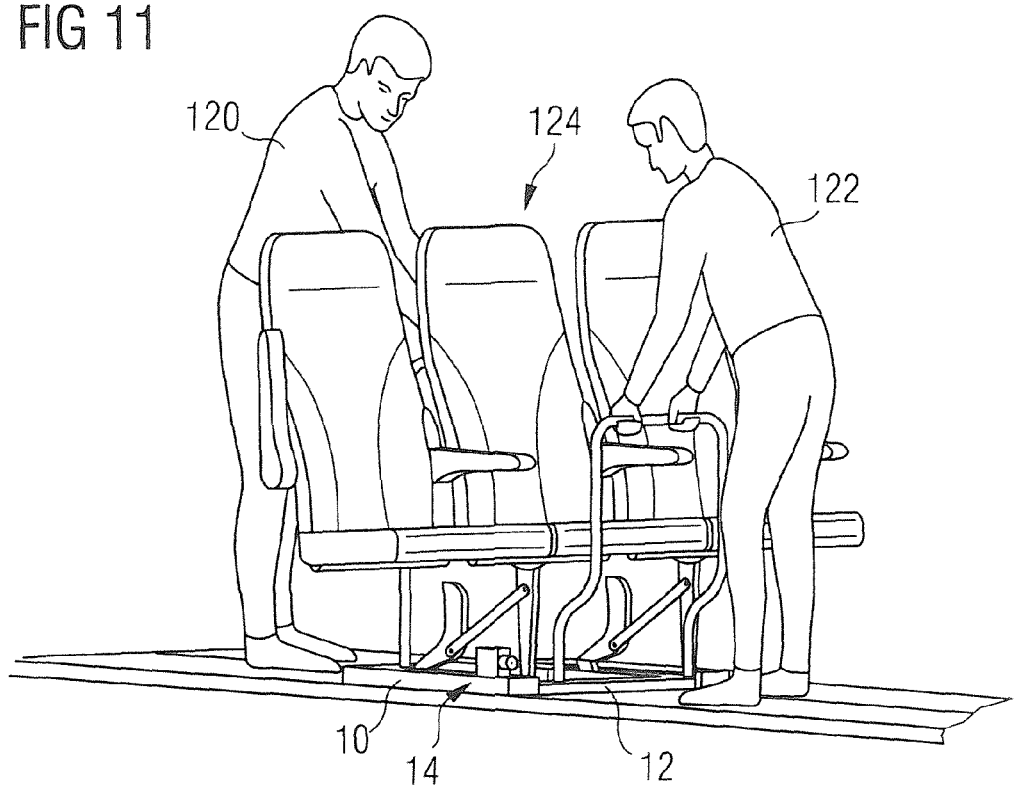
FIG. 11 shows a first schematic representation of a third method step for seat assembling.

FIG. 11 shows a third method step for the seat assembling, the seat conveying device 12 and the seat installing device 10 being positioned with respect to one another.

In this connection, the second operator 122 pushes the seat conveying device 10 toward the seat installing device 12 until the two coupling devices 20, 84 detect one another. The positioning projections 92, 94 are pushed into the receiving means 62, 64 up to the stop. The second operator 120, in this case, checks that the positioning of the seat installing device 10 is maintained.

Figure 12:
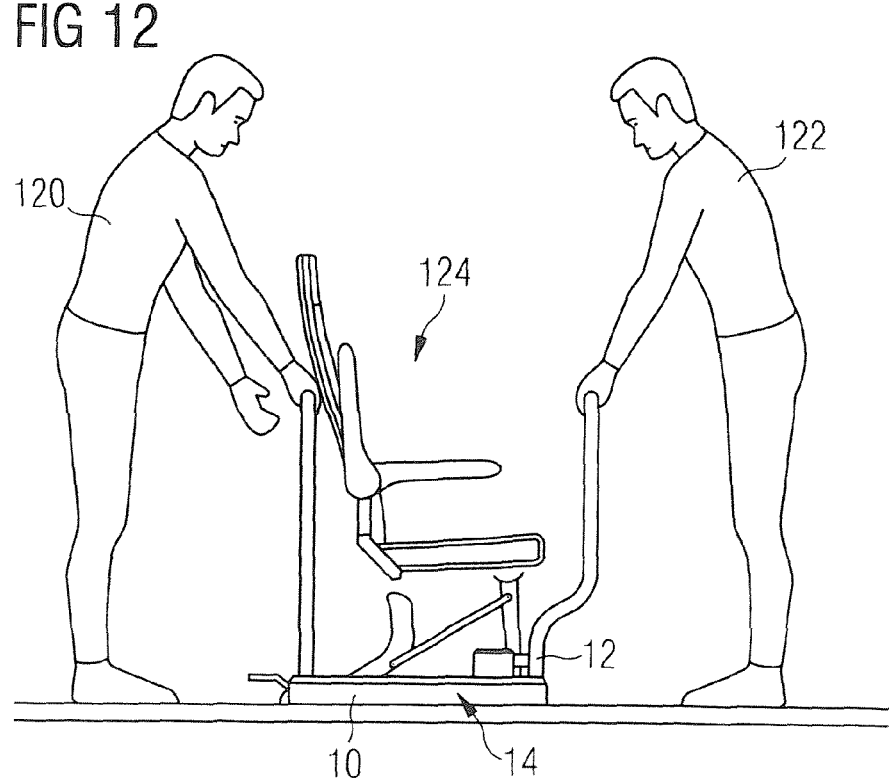
FIG. 12 shows a second schematic representation of the third method step.
Figure 13:
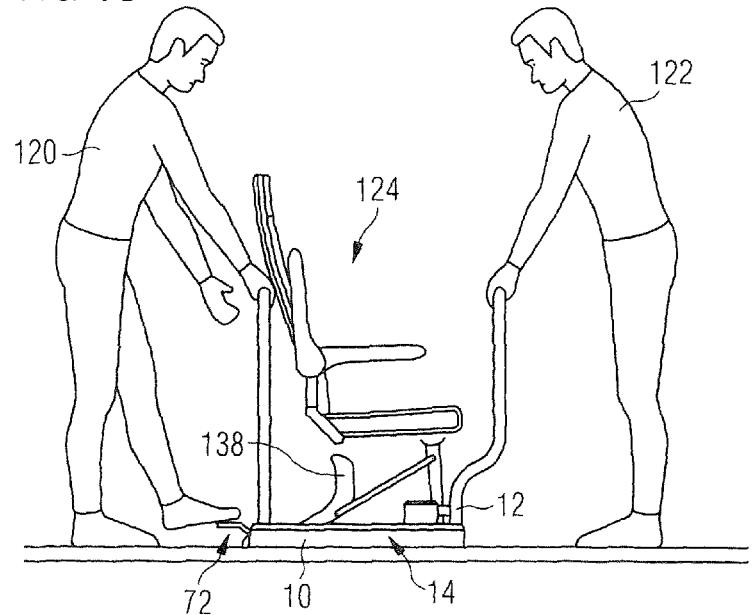
FIG. 13 shows a schematic representation of a fourth method step.
Figure 14:
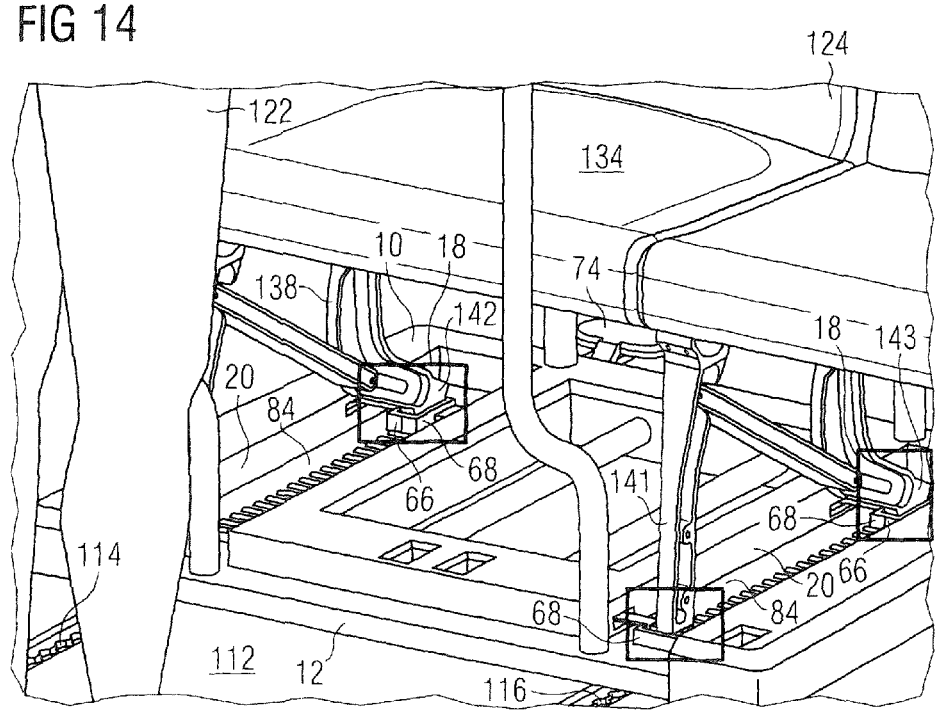
FIG. 14 shows a representation of a detail of the fourth method step.

FIGS. 12 and 13 show a fourth step of the seat assembling. In this case, the seat installing device 10 and the seat conveying device 12 are fixed to one another, the seat installing device 10 being located at the predetermined position. The first operator actuates the seat gripping and holding device 18 by means of the actuating device 72 in order to grip and hold the seat 124. To this end, the first operator 120 actuates the foot pedal 74, as a result of which the four pairs of clamping jaws 66, 68 are extended and at the same time clamp the four seat feet 140, 141, 142, 143. FIG. 14 shows seat feet 140, 141, 142 and 143 clamped between the clamping jaws 66, 68.

Subsequently to this, the second operator 122 pulls the seat conveying device 12 out of its receiving means in the seat installing device 10 and removes the seat conveying device 12.

Figure 15:
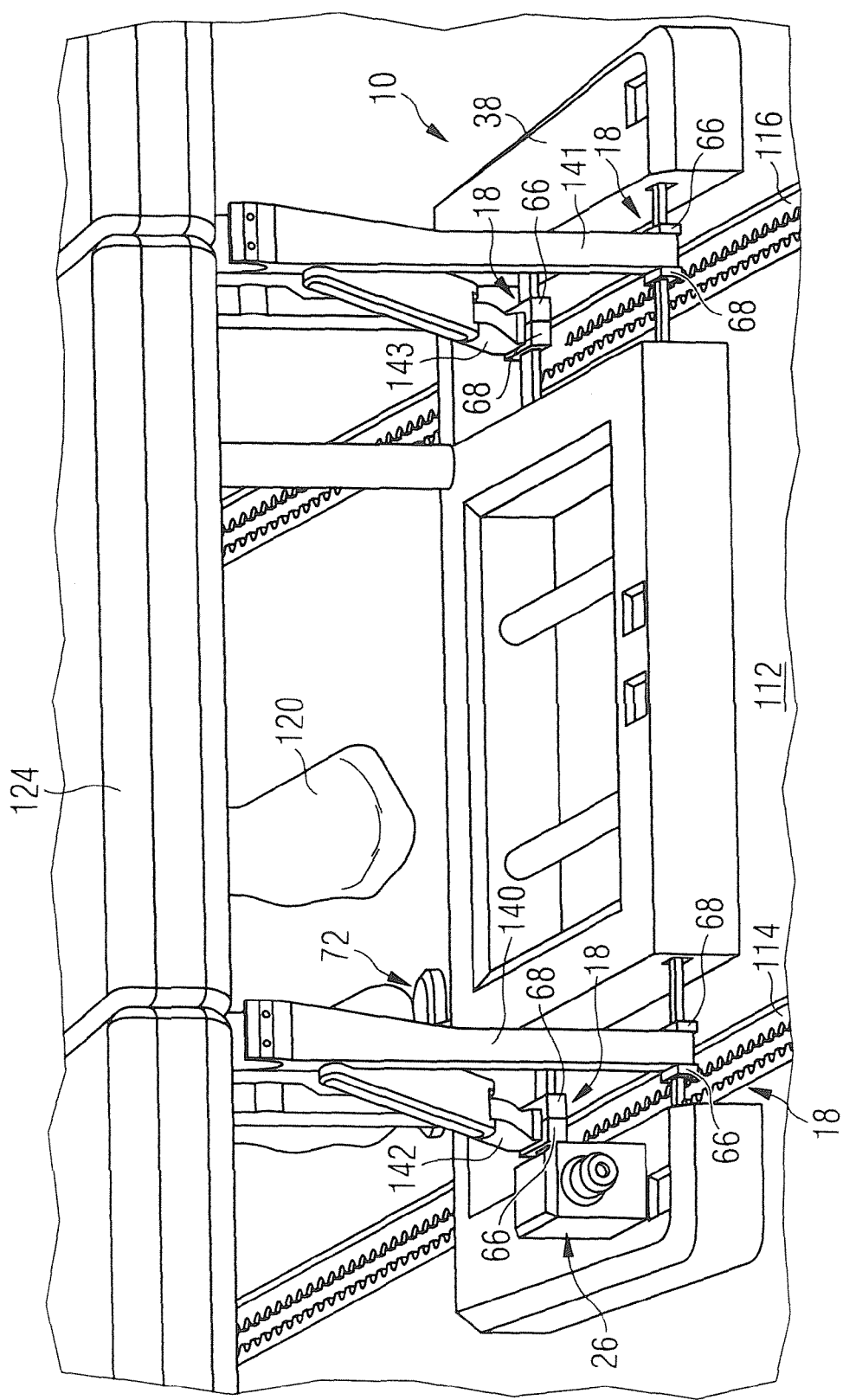
FIG. 15 shows a first schematic representation of a fifth method step for seat assembling.
Figure 16:
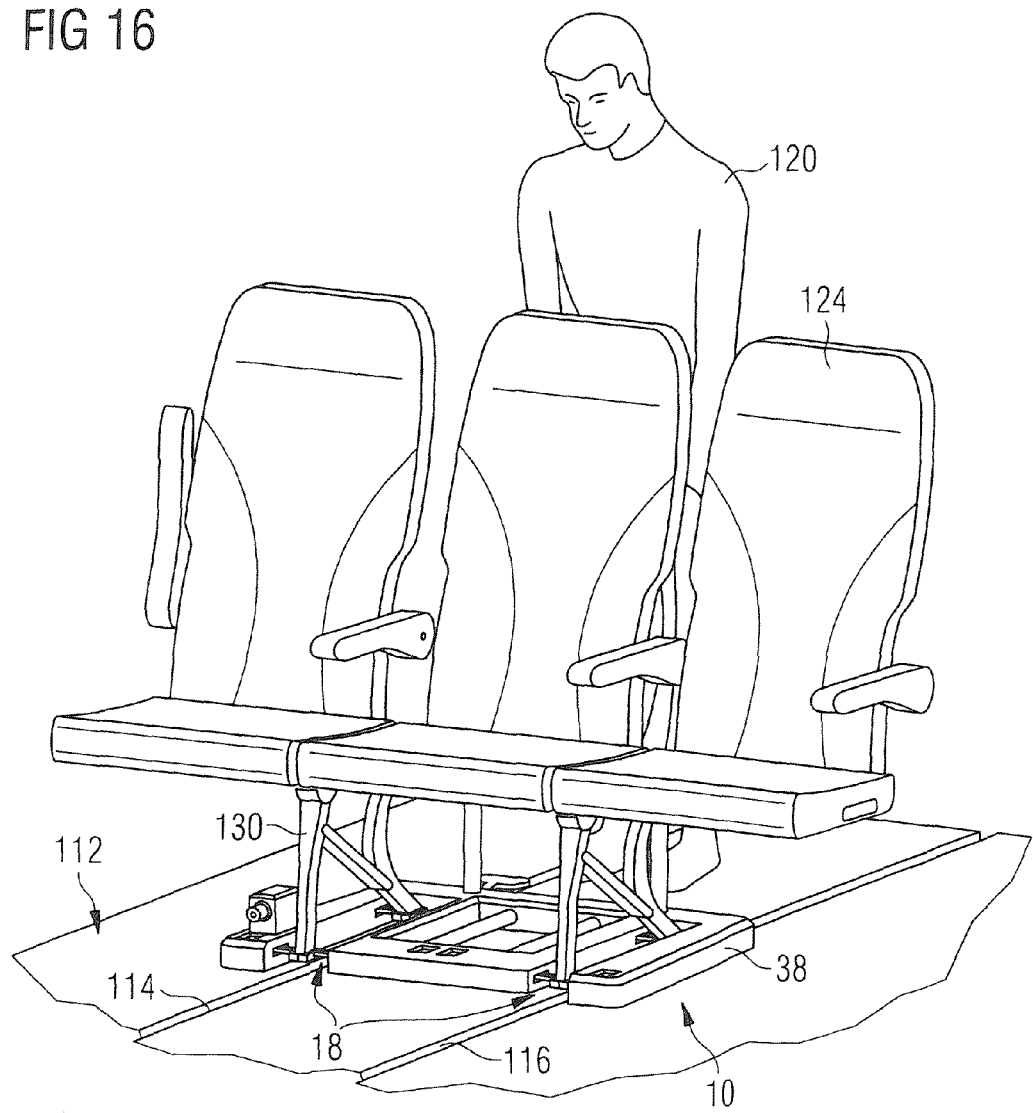
FIG. 16 shows a second schematic representation of the fifth method step.

FIGS. 15 and 16 then show the seat installing device 10 with the seat 124 held in the seat gripping and holding device 18 and consequently explain the fifth step of the seat assembling, in which the seat conveying device 12 is removed.

In said position shown in FIGS. 15 and 16, the first operator 120 actuates the seat gripping and holding device 18 in order to release the clamping jaws. As a result, the seat 124 is lowered and the seat feet 140-143 engage in the seat rail. The seat 124 is then pushed forward again by a certain distance, for example half an inch (1.27 cm), into the final assembly position by means of the seat installing device 10.

Figure 17:
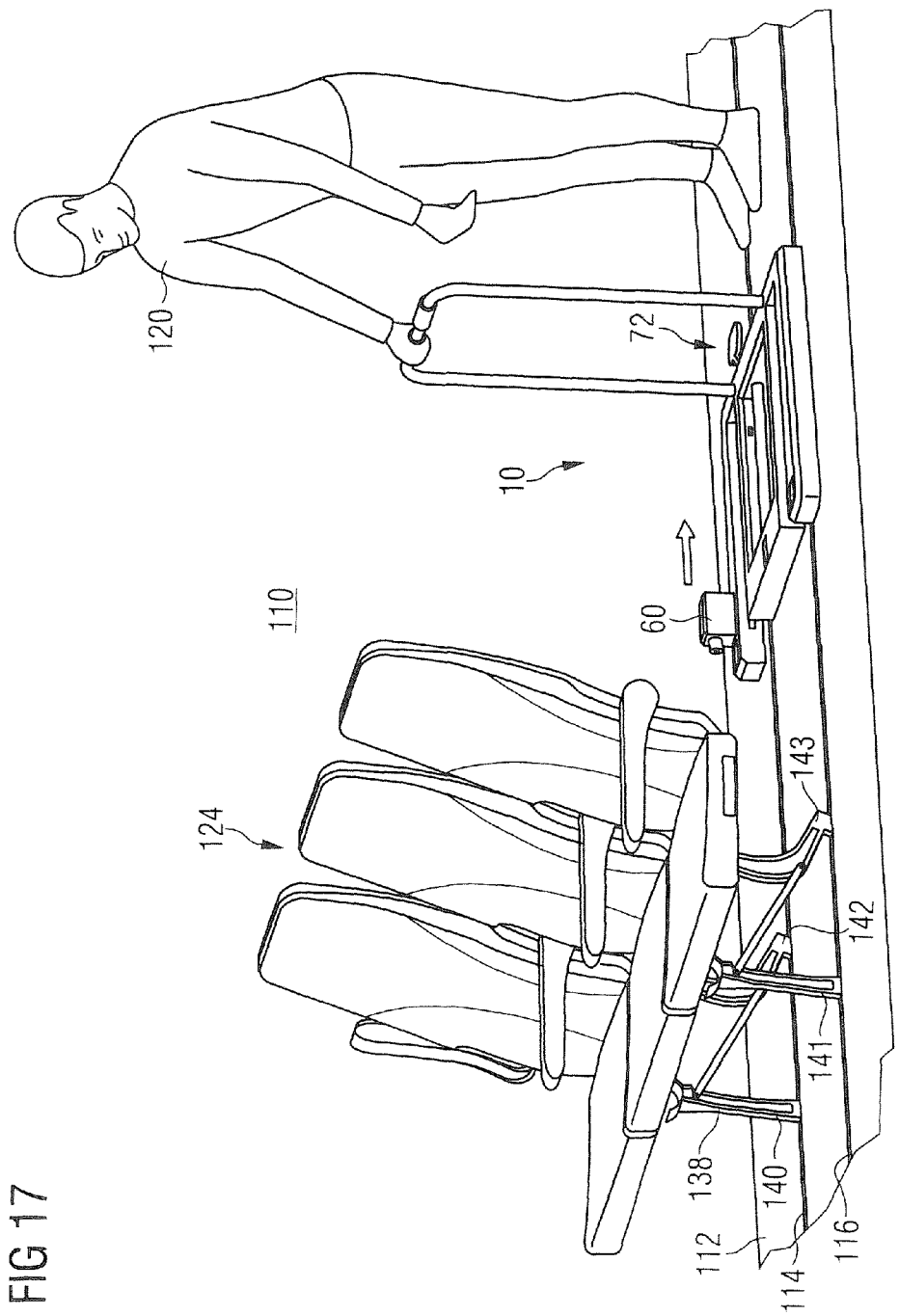
FIG. 17 shows a schematic representation of a sixth method step for seat assembling.

FIG. 17 shows the sixth and last step of the seat assembling in which the clamping jaws 66, 68 are released and the seat installing device is removed by being pulled rearward.

Figure 18:
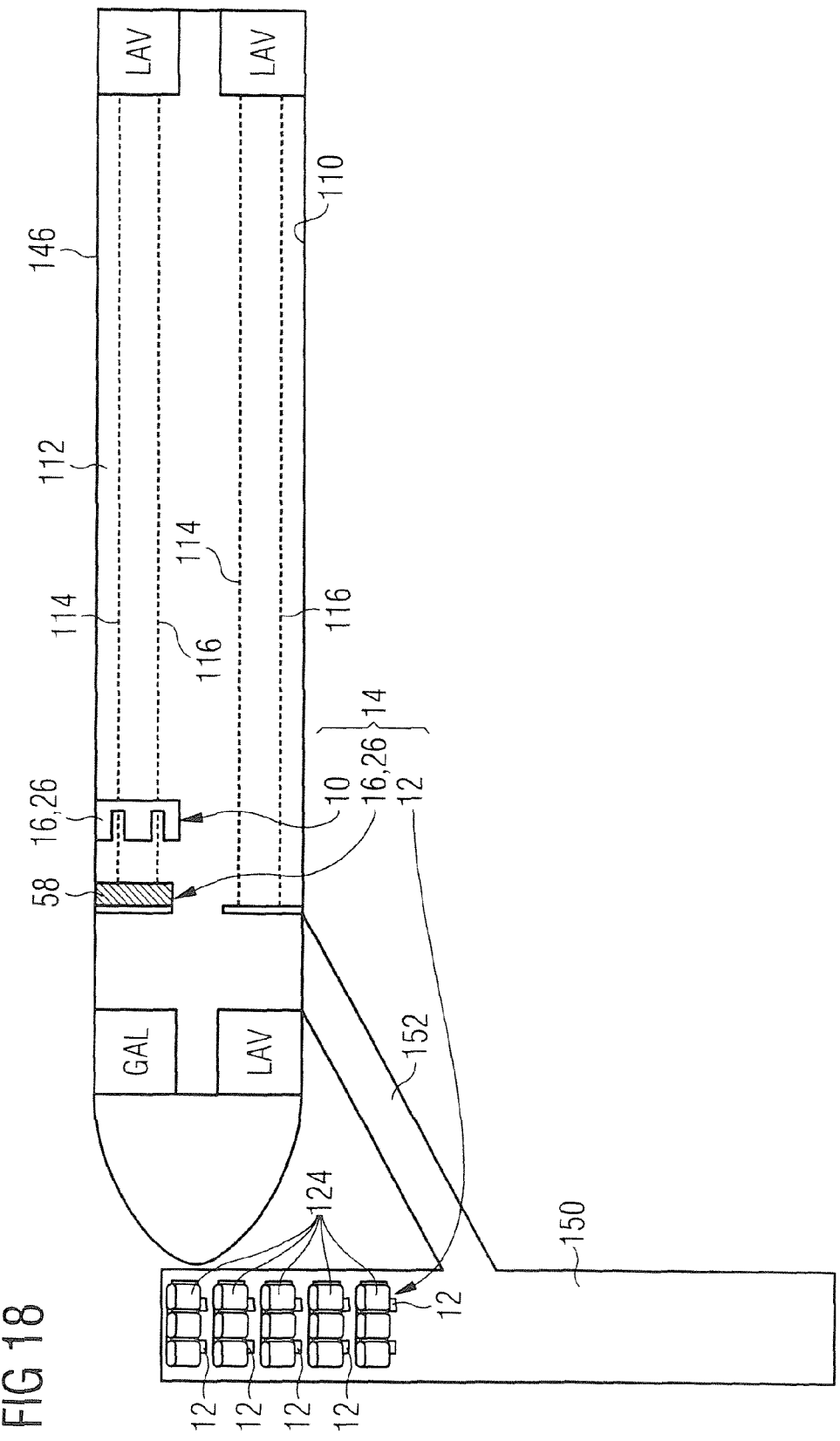
FIG. 18 shows a schematic overview representation to explain the concept of seat assembling.

FIG. 18 shows a schematic overview of the aircraft cabin 110 during the seat assembling in order to explain the method for seat assembling once again in a summarizing manner.

Several of the seats 124 with corresponding seat conveying devices 12 (in each case one per seat 124) are transported by the seat manufacturer to a work platform 150. The seats 124 can be moved from the work platform 150 along a ramp 152 into the interior of the aircraft cabin 110 by means of the seat conveying device 12. Two pairs of seat rails 114, 116 are situated inside the aircraft cabin 110, the already positioned seat installing device 10 being indicated on one of said pairs of seat rails 114, 116. The seat installing device 10 takes the seat 124 over from the seat conveying device 12, positions the seat 124 corresponding to a cabin layout specification using the laser 60, lowers the seat into the seat rails 114, 116 at a target position and carries out a displacement by a predetermined distance into the final seat position.

The laser 60 positions the seat installing device 10 including the seat 124 to the target position corresponding to the cabin layout specification. It is possible to provide several lasers 60 for a fail-safe operation and to achieve minimum tolerances.

The seat conveying device 12 serves for conveying the seats 124 from the seat manufacturer to the warehouse, from the warehouse to the work platform 150 and from the work platform 150 into the aircraft cabin 110. It supplies the seat 124 to the seat installing device 10 without lifting the seat 124.

As the seat conveying device 12 only fulfills transporting jobs and no lifting or assembling functions, the seat conveying device 12 is able to be constructed simply and cost-efficiently. Consequently, it is possible, in a cost-efficient manner, to use a plurality of seat conveying devices 12 which all interact with one single seat installing device 10. The seat installing device 10 can correspondingly be constructed in a more expensive and costly manner, it being possible for positioning tasks as well as data transferring functions to be performed along with the functions of taking over and assembling the seats.

Figure 19:
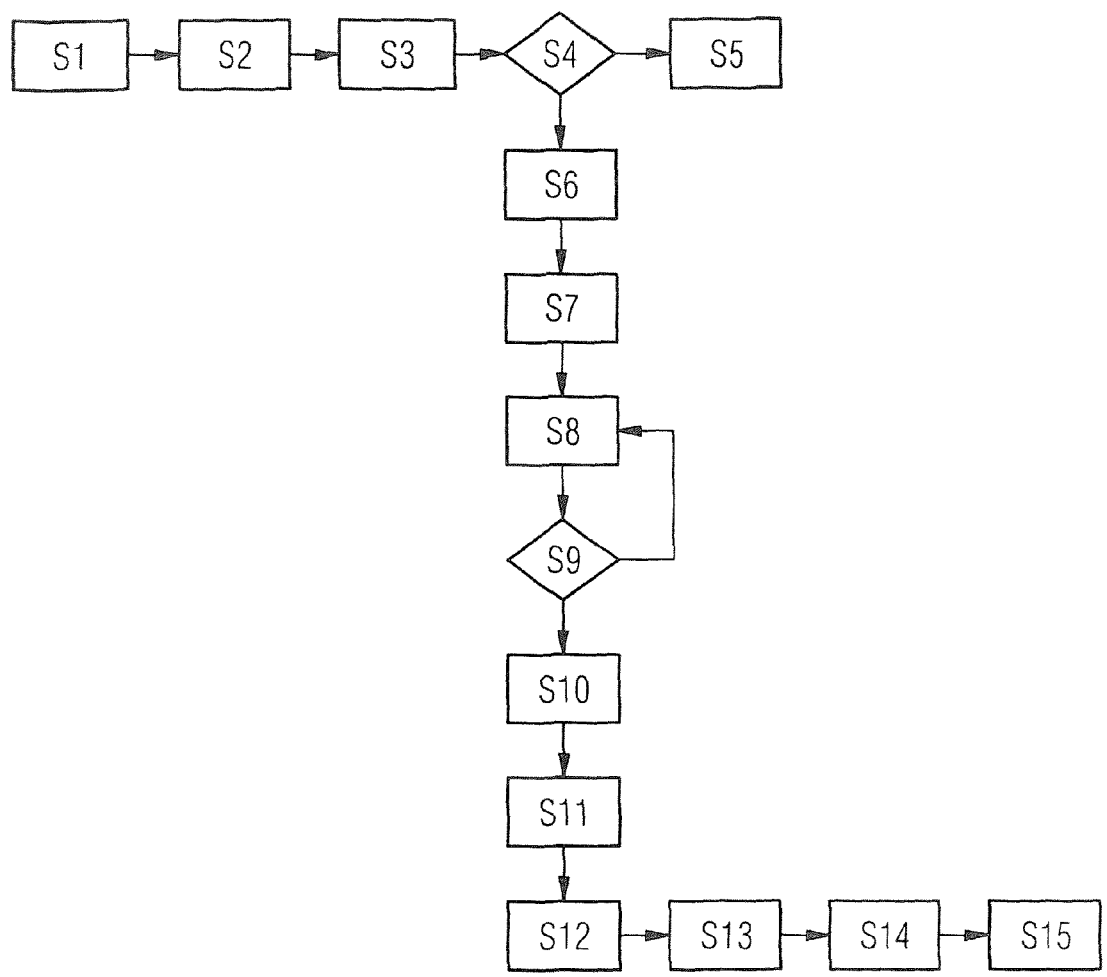
FIG. 19 shows a flow diagram to represent the overview of an embodiment of the method for seat assembling.

FIG. 19 shows an embodiment by way of a flow diagram which is self-explanatory by way of the following legend:

LEGEND

The individual steps in the flow diagram of FIG. 19 designate the following:

S1 Commissioning of seats
S2 Production of seats
S3 Delivery of seats
S4 Query warehouse or dock
S5 Warehouse
S6 Prepare seats (row of seats) at the dock
S7 Adjust seat installing device in first position
S8 Introduce seat (row of seats) from the dock into the seat installing device
S9 Query: correct position?
S10 Remove seat conveying device
S11 Introduce seat feet into seat rails
S12 Displace seat feet by half an inch in the seat installing device
S13 Remove seat installing device
S14 Fasten seat (row of seats) in the seat rail
S15 Re-adjust seat installing device in the next installation position After step S15, return to step S8 until all the seats (rows of seats) are installed.

Advantages of the seat assembling method are: improved working safety, certain method stability and reliability, a certain position of a consistent process per se between the individual platforms; reduction in used-up resources and reduction in work times required for the installation.

To optimize the method, it is advantageous to create data banks and catalogs for seats, seat frames, fastenings and bottom seat frames as well as seat rail configurations.

The seat arrangement layouts can be analyzed and made available in a machine-readable form.

To optimize the seat conveying device, it is advantageous to analyze the supply chain for the seats in a detailed manner.

It is possible to optimize the positioning, transferring and assembling procedures using the seat installing device 10 by analyzing the seat installation process.

In addition, the seat installing device 10 and the seat assembling device 14 shown make possible an advantageous combination between the optical measuring device 56 and seat rail reference marks. As a result, cabin compartments and installation processes can be shown in a virtual manner in order to make new tools for planning and simulation available.

A further possible use of the seat installing device 10 is the possibility of quickly modifying the seat cabin layout, for example following maintenance jobs or conversions.

LIST OF REFERENCES

10 Seat installing device
12 Seat conveying device
14 Seat assembling device
16 Positioning system
18 Seat gripping and holding device
20 First coupling device
22 First handling device
24 First positioning device
26 Second positioning device
28 First engagement projection
30 Second engagement projection
32 First roller
34 Second roller
36 Rear edge region
38 Base part
40 Basic frame
42 Leg
44 Leg
46 Stabilizing frame
48 Front region
50 Third roller
51 Fourth roller
52 Fifth roller
53 Sixth roller
54 Displacing device
56 Optical measuring device
58 Measuring instrument
60 Laser
62 Receiving means
64 Receiving means
66 Clamping jaw
68 Clamping jaw
70 Handle
72 Actuating device
74 Foot pedal
80 Displacing device
82 Seat supporting device
84 Second coupling device
86 Second handling device
88 Frame part
90 Handle
92 Positioning projection
94 Positioning projection
96 Leg
98 Leg
100 Receiving indentations
102 Stops
104 Rollers
106 Connecting web
108 Trolley
110 Aircraft cabin
112 Floor
114 Seat rail
116 Seat rail
120 First operator
122 Second operator
124 Seat
126 Row of seats
128 Individual seat
129 Individual seat
130 Individual seat
132 Back rest
134 Sitting surface
136 Armrest
138 Seat frame
140 Front seat foot
141 Front seat foot
142 Rear seat foot
143 Rear seat foot
146 Airplane
150 Work platform
152 Ramp
S1 Commissioning of seats
S2 Production of seats
S3 Delivery of seats
S4 Query warehouse or dock
S5 Warehouse
S6 Prepare seats (row of seats) at the dock
S7 Adjust seat installing device in first position
S8 Introduce seat (row of seats) from the dock into the seat installing device
S9 Query: correct position?
S10 Remove seat conveying device
S11 Introduce seat feet into seat rails
S12 Displace seat feet by half an inch in the seat installing device
S13 Remove seat installing device
S14 Fasten seat (row of seats) in the seat rail
S15 Re-adjust seat installing device in the next installation position

The invention claimed is:

1. A seat assembling method for assembling at least one seat into an airplane, said method having the following steps:
   a) position a seat installing device at a predetermined assembly position in the airplane,
   b) convey the at least one seat into an interior of the airplane to the seat installing device by means of a seat conveying device,
   c) after positioning the seat installing device at the predetermined assembly position, transfer the at least one seat from the seat conveying device to the seat installing device,
   d) install the at least one seat by means of the seat installing device which is positioned at the assembly position,
   characterized in that step c) includes:
      c1) move the seat conveying device into positive locking with the positioned seat installing device;
      c2) grip and hold the seat by means of a seat gripping and holding device which is mounted on the seat installing device; and
      c3) remove the seat conveying device.

2. The seat assembling method as claimed in claim 1, characterized in that step d) includes the following steps which are to be carried out by means of the seat installing device:
   d1) lower the at least one seat into a seat rail which is arranged on the airplane,
   d2) move the at least one seat to the desired seat position.

3. The seat assembling method as claimed in claim 1, characterized in that step b) includes:
   b1) convey the at least one seat from a seat supplier to the seat installing device.

4. The seat assembling method as claimed in claim 1, characterized in that step a) includes:
- a1) position the seat installing device by way of a seat rail in a direction extending transversely with respect to the seat rail and
- a2) position the seat installing device in a longitudinal direction of the seat rail by means of an optical distance measuring instrument.

5. The seat assembling method as claimed in claim 1, characterized by the step which is effected after step d):
- e) release the seat gripping and holding device and remove the seat installing device.

6. The seat assembling method as claimed in claim 1, wherein step b) includes conveying the at least one seat into the interior of the airplane to the seat installing device while the seat installing device remains stationary at the predetermined assembly position in the airplane.

7. The seat assembling method as claimed in claim 1, wherein step b) includes conveying the at least one seat into the interior of the airplane to the seat installing device without moving the seat installing device from the predetermined assembly position.

8. The seat assembling method as claimed in claim 1, wherein step b) includes conveying the at least one seat into the interior of the airplane to the seat installing device positioned at the predetermined assembly position in the airplane using the means of a seat conveying device by hand.

9. The seat assembling method as claimed in claim 1, wherein step a) includes position a seat installing device at a predetermined assembly position in the airplane while the at least one seat to be conveyed in step b) is located outside the interior of the airplane.

10. The seat assembling method as claimed in claim 1, further comprising:
- prior to step a), bringing the seat installing device inside the interior of the airplane;
- after step d):
  - e) position the seat installing device at a second predetermined assembly position in the airplane different than that of step a);
  - f) convey a second at least one seat into the interior of the airplane to the seat installing device by means of the seat conveying device while the seat installing device is positioned at the second predetermined assembly position;
  - g) transfer the second at least one seat from the seat conveying device to the seat installing device; and
  - h) install the second at least one seat by means of the seat installing device which is positioned at the second assembly position.

11. The seat assembling method as claimed in claim 1, wherein the conveyance of the at least one seat inside the aircraft to the predetermined assembly position is executed entirely using the seat conveying device by hand.

12. The seat assembling method as claimed in claim 1, wherein the conveyance of the at least one seat inside the aircraft to the predetermined assembly position is executed while the seat installing device is positioned at the predetermined assembly position.

13. The seat assembling method as claimed in claim 1, further comprising, prior to step a), bringing the seat installing device into the interior of the airplane, wherein the transfer of the at least one seat from the seat conveying device to the seat installing device is executed while the seat installing device is positioned at the predetermined assembly position.

14. The seat assembling method as claimed in claim 1 wherein step b) is executed before step c).

15. A seat assembling method for assembling at least one seat into an airplane, said method having the following steps:
- a) position a seat installing device at a predetermined assembly position in the airplane,
- b) convey the at least one seat into an interior of the airplane to the seat installing device by means of a seat conveying device,
- c) after positioning the seat installing device at the predetermined assembly position, transfer the at least one seat from the seat conveying device to the seat installing device,
- d) install the at least one seat by means of the seat installing device which is positioned at the assembly position,
  - wherein the method further comprises, after step b) and before step c), interlocking the seat installing device and the seat conveying device in a gripping positive locking manner.

16. A seat assembling method for assembling at least one seat into an airplane, said method having the following steps:
- a) position a seat installing device at a predetermined assembly position in the airplane,
- b) convey the at least one seat into an interior of the airplane to the seat installing device by means of a seat conveying device,
- c) after positioning the seat installing device at the predetermined assembly position, transfer the at least one seat from the seat conveying device to the seat installing device,
- d) install the at least one seat by means of the seat installing device which is positioned at the assembly position,
- where step c) is executed while the seat installing device and the seat conveying device are coupled together such that the seat installing device and the seat conveying device are interlocked in a gripping positive locking manner.

* * * * *